(12) United States Patent
Campbell

(10) Patent No.: US 8,935,376 B2
(45) Date of Patent: Jan. 13, 2015

(54) METHOD AND DEVICE FOR ALTERNATIVE STATUS NOTIFICATION

(75) Inventor: Alexander Wade Campbell, Woodinville, WA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 68 days.

(21) Appl. No.: 13/446,974

(22) Filed: Apr. 13, 2012

(65) Prior Publication Data

US 2013/0275491 A1    Oct. 17, 2013

(51) Int. Cl.
   *H04L 12/24*    (2006.01)

(52) U.S. Cl.
   USPC ............................. 709/223; 709/224; 709/225

(58) Field of Classification Search
   USPC .......................................... 709/223, 224, 225
   See application file for complete search history.

(56) References Cited

U.S. PATENT DOCUMENTS

| | | | |
|---|---|---|---|
| 6,073,241 A * | 6/2000 | Rosenberg et al. ................ 726/3 |
| 6,167,448 A * | 12/2000 | Hemphill et al. ............ 709/224 |
| 6,393,475 B1 * | 5/2002 | Leong et al. ................... 709/223 |
| 6,888,927 B1 * | 5/2005 | Cruickshank et al. ...... 379/88.11 |
| 2003/0198187 A1 * | 10/2003 | Mellquist et al. ............. 370/242 |
| 2008/0147870 A1 * | 6/2008 | Tomono ......................... 709/228 |
| 2008/0184030 A1 * | 7/2008 | Kelly et al. .................... 713/156 |
| 2013/0054671 A1 | 2/2013 | Maki |

\* cited by examiner

*Primary Examiner* — Kevin Bates
*Assistant Examiner* — Jeyanath Jeyaratnam
(74) *Attorney, Agent, or Firm* — Ascenda Law Group, PC

(57) ABSTRACT

In a system for delivering notifications to a network administrator's web browser during normal web browsing, a transaction state management module disposed between the web browser and the Internet tracks and manages various states of communications, a notification module stores notification messages, and an authentication module is configured to authenticate web page requests. Upon identifying the administrator through the authentication module, a client-side proxy temporarily stores the original HTTP request. A notification generator module constructs a notification data, and a special link to acknowledge the notice, which are returned to the web browser. Once the administrator selects the link, the original HTTP request is extracted from storage and forwarded by a server-side proxy to the original destination server.

7 Claims, 7 Drawing Sheets

METHOD AND DEVICE FOR ALTERNATIVE STATUS NOTIFICATION

TECHNICAL FIELD

The present invention relates to a method and system for trafficking network communications, and more particularly to methods of sending notification messages to network administrators.

BACKGROUND

Email or syslog notifications are common methods of communication on a network device. Syslog is a standard for logging program messages that allows separation of the software that generates email messages from the system that stores them and the software that reports and analyzes the messages. In general, a network administrator monitors the network and ought to be informed of the network status, or of situations where some event has occurred in the network or proxy itself. In a traditional network management tool or network information system, the administrator may receive these messages through a syslog protocol, which is a stream of text sent to the server that does something intelligent, e.g., the server sends the message out as a page, the server sends a text message to a cell phone, or the server sends an email containing the original message. The network administrator deals with these types of actions frequently in order to monitor the activities on the network, for example, when the server is not operational, the intermediary device informs the administrator that there is some type of failure, such as a hard drive failure or other causes.

FIG. 1 is a block diagram illustrating a conventional flow of communicating a web browser request in a network. In these web-browsing transactions, a web browser 10 (also referred to as an "administrator's web browser") sends requests at sequence 1a through an intermediate intermediary device 12 (also referred to as a "proxy device"), which in turn generates server-side requests at sequence 2a on the web browser's behalf to the Internet 14. The server's response at sequence 3a is then passed back from the Internet 14 to the intermediary device 12 as appropriate in a client-side response at sequence 4a to the web browser 10.

As an Internet gateway security proxy, the intermediary device 12 is in the flow of all HTTP/HTTPS (commonly known as "web") traffic and can apply user-level access controls based on authentications. By collecting the administrator's network username, dynamic policy can be configured to return status information and other device notifications in place of the requested web content. These notifications should be returned only when the request is identified as originating from the administrator (via authentication) and is a true web-browsing event (excluding non-browser applications or non-web page transactions). In addition to the notification text/data, the returned page should include a link to proceed to the originally requested page so that browsing is not interrupted.

Accordingly, it would be desirable to provide a method and device that provides an alternate notification messaging channel to an administrator via his/her normal web-browsing activities.

SUMMARY OF THE INVENTION

Embodiments of the present invention provide a system, method, and article of manufacture for delivering a notification to a network administrator's web browser during the normal course of web browsing by the network administrator. An intermediary device including a transaction state management module is placed between the administrator's web browser and the Internet for tracking and managing the various states of communication. A notification module is configured to store one or more notification messages intended for a network administrator. An authentication module is configured to authenticate that a web page request came from the network administrator. In a first embodiment, when a notification is queued in the client-side proxy upon identifying the administrator through an authentication module, the client-side proxy temporarily stores the original HTTP request. A notification generator module is configured to construct a notification message and a special link to acknowledge the notification message, which are then returned to the administrator's web browser. Once the administrator clicks the special link, his/her original HTTP request is extracted from storage and forwarded by the server-side proxy module to the original destination server in the Internet.

In a second embodiment, instead of creating an entirely new HTML page by the notification generator module, a web page modification module is configured to modify an HTML page received from the web server through the Internet in a server-side transaction. When a response comes back from the Internet to the server-side proxy module, the web page modification module is configured to modify the retrieved HTML web page to include a notification message in addition to the original content, and send the modified HTML web page to the administrator's web browser.

Broadly stated, a system having a proxy engine comprises a notification queue module configured to store one or more notification messages directed to a predetermined sender associated with the web browser in a queue; an authentication module, communicatively coupled to the notification queue module, configured to authenticate if a web page request is sourced from a predetermined sender; a client-side proxy module, communicatively coupled to the transaction state management, configured to receive the web page request from the predetermined user and to return a response to the web browser associated with the predetermined user; a notification generator module configured to construct a notification message for sending to the predetermined user's web browser when there exists the notification message in the queue directed to the predetermined user's web browser; a server-side proxy module configured to communicate with a network and a web server; and a transaction state management module configured to manage sequences of communications within the proxy engine for communication between the predetermined user's web browser and the web server through the network and the server-side proxy module, the transaction state management module communicatively coupled to the notification queue module, the authentication module, the client-side proxy module, notification generator module, and the server-side proxy module.

The structures and methods of the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

BRIEF DESCRIPTION OF THE DRAWINGS

The present invention is illustrated by way of example, and not limitation, in the figures of the accompanying drawings in which.

DETAILED DESCRIPTION

Figure 1:
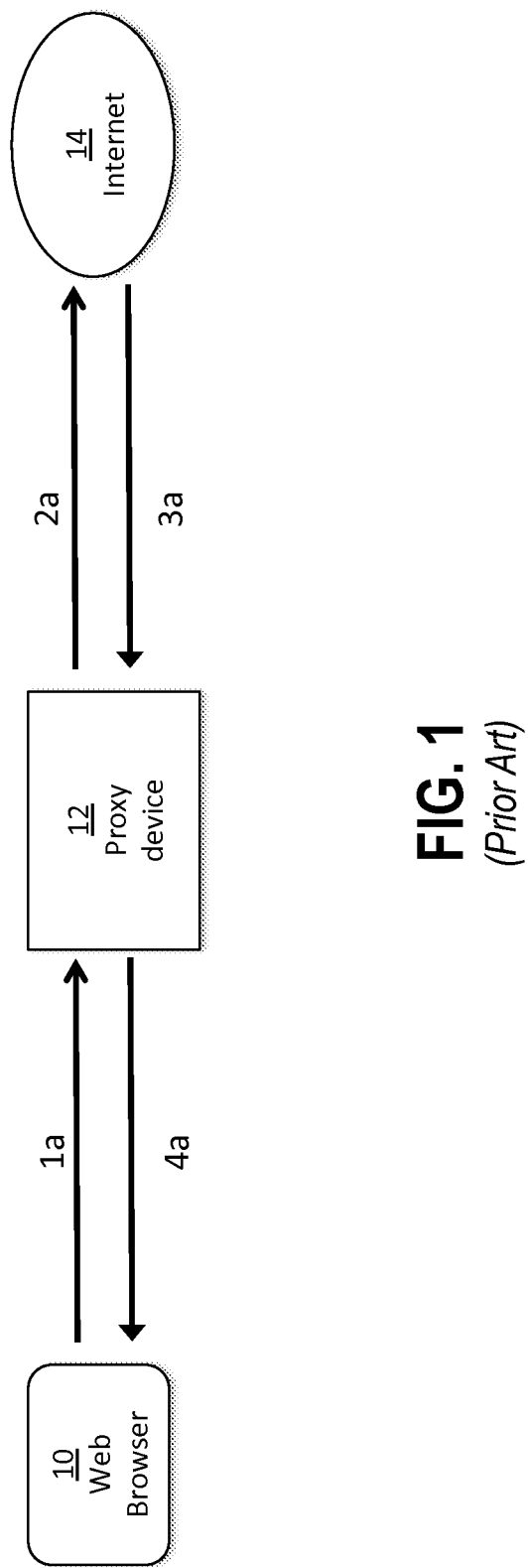
FIG. 1 is a block diagram illustrating a conventional flow of communicating a web browser request in a network.

A description of structural embodiments and methods of the present invention is provided with reference to FIGS. 2-7. It is to be understood that there is no intention to limit the invention to the specifically disclosed embodiments but that the invention may be practiced using other features, elements, methods, and embodiments. Like elements in various embodiments are commonly referred to with like reference numerals.

Figure 2:
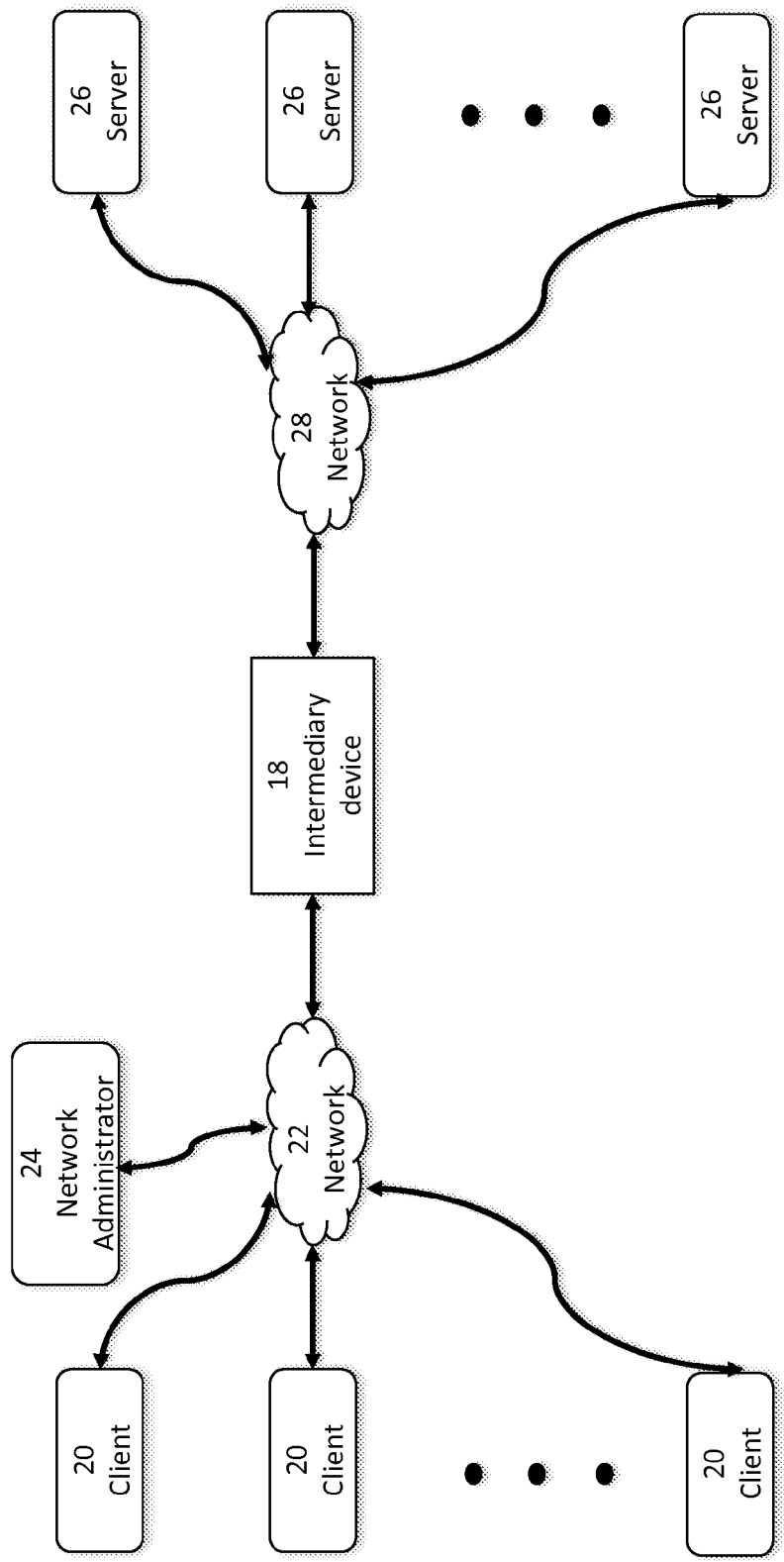
FIG. 2 is a block diagram illustrating a client/server network having a network intermediary device configured in accordance with one embodiment of the present invention.

FIG. 2 is a block diagram illustrating a client/server network 16 utilizing a network intermediary device 18. The network system 16 comprises any number of client devices 20, collectively referred to as a client network, connected to the network intermediary device 18 via a network 22. Each client device 20 ('client') is a computing device, originated from a client, capable of making a web page request (e.g., for an object, service, etc.) over the network 22 and receiving a response for the request. As used in the specification, the term network administrator 24 also comprises a computing device, originated from a network administrator, capable of making a web page request (e.g., for an object, service, etc.) over the network 22 and receiving a response for the request. For instance, the client 20 may be a personal computer (PC), a hand-held device or personal digital assistant (PDA) type device, a mobile phone, a tablet computer, etc. In one embodiment, the client is a PC running a web browser application and may make requests for objects over the network 22 by utilizing the web browser. Each client device is coupled to the network intermediary device using a client communication path that can include a dial-up connection, a local area network (LAN), a wide area network (WAN), an IP network (such as an internet, intranet, or extranet), or some combination thereof. As used herein, the terms "client" and "server" refer to relationships between the client or server and the network intermediary device, not necessarily to particular physical devices. As used herein, the term "client device" includes any device taking on the role of a client in a client-server environment. There is no particular requirement that the client devices 20 must be individual devices; they can each be a single device, a set of cooperating devices, a portion of a device, or some combination thereof.

The network intermediary device 18 is a computing device capable of receiving and responding to the request made by the client device 20. In one embodiment, the network intermediary device 18 is a cache appliance with an internal object store housing objects that may be requested by the client device 20. The network intermediary device is communicatively coupled to any of a number of content servers 26, collectively referred to as a server network 26, via a network 28. Messsages are transmitted between the client device 20 and the server 26. A message may contain "objects" or "resources," which are named chunks of data, or may include requests for such objects, or portions of those objects, or a combination of objects and requests for objects.

Networks 22 and 28 may be distinctly separate networks or the same (or portions of the same) network and may be any kind of networks known in the art. For instance, networks 22 and 28 may be private networks, such as intranets, extranets, LANs, or WANs. Networks may also be (in whole or in part) public networks, such as the Internet. Furthermore, many computer devices have multiple network interfaces and, thus, networks 22 and 28 may contain multiple upstream or downstream networks of wired and/or wireless segments. Nevertheless, in the interest of brevity, networks 22 and 28 hereafter are referred to by the general term "network" to mean any kind of medium over which the client device 20 and the network intermediary device 18 communicate.

Servers 26 provide content to the network intermediary device 18. The purpose of the plurality of servers 26 is to provide a requested object to the network intermediary device 18 when the network intermediary device 18 does not have the object in its object store. The network intermediary device 18 has the ability to query any one of the plurality of servers 26 for the object. Servers 26 are computer devices that can receive the query and respond in kind with the requested object. Each server device is coupled to the network intermediary device using a server communication path that can include a dial-up connection, a LAN, a WAN, an IP network, or some combination thereof. In one embodiment, the server communication path includes an internet backbone and an internet connection between the network intermediary device and the internet backbone. As used herein, the term "server" or "server device" includes any device taking on the role of a server in a client-server environment, or to any device transmitting objects in a peer-to-peer environment. There is no particular requirement for the server devices 26 to be individual devices; they can each be a single device, a set of cooperating devices, a portion of a device, or some combination thereof. Generally, a server device includes memory or storage for recording one or more web objects, which can be any type of data suitable for transmitting to the client device 20 (e.g., text, color, formatting, and directions for display; pictures, data in graphical formats (such as GIF or JPEG), and other multimedia data; animation, audio (such as streaming audio), movies, and video (such as streaming video), and other data in audio or visual formats (such as MPEG); program fragments, including applets, Java, javascript, and ActiveX; and other web documents and data types).

In some embodiments of the present invention, nodes (which refer to clients 20 and the server 26) on either side of the network intermediary device 18 may act as clients and servers. The network intermediary device 18 may connect to multiple networks, on which nodes may exist that act as both "requestors" and "responders," potentially at the same time, depending on the nature of the network protocols or application protocols being used for information exchange.

In some embodiments of this invention, nodes on either side of the network intermediary device 18 may act as clients and servers, and the network intermediary device 18 may connect to one or more networks, on which nodes may exist that act as both "requestors" and "responders," potentially at the same time, depending on the nature of the network protocols (also referred to as "application protocols" where an application protocol may be a specific class of the network protocol) being used for information exchange. There are various types of network protocols as specified by Open Systems Interconnection (OSI) model layers, which include the Hypertext Transfer Protocol (HTTP), the File Transfer Protocol (FTP), and the Real Time Streaming Protocol (RTSP).

Figure 3A:
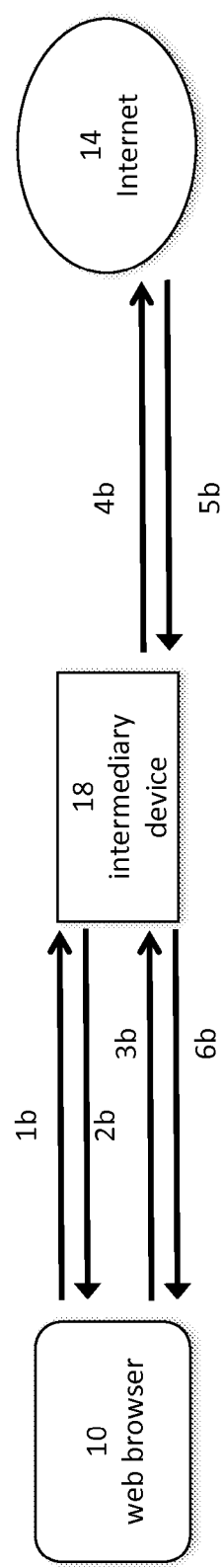
FIGS. 3A and 3B are simplified block diagrams illustrating sequential flows of an alternate status notification according with an embodiment of the present invention.

FIG. 3A is a simplified block diagram illustrating sequential flows of an alternate status notification according to an embodiment of the present invention. In a proxy configuration, an intermediary device 18 is placed in a traffic flow between the users and the Internet. The intermediary device 18 performs many functions, one of which may be to provide authentication of a received email message. For example, the intermediary device 18 polices the traffic flow by allowing a certain group of users to access a particular website. In this process, the intermediary device 18 would be able to detect the owner of that transaction. If the owner happens to be an administrator, and the intermediary device 18 would like to notify the administrator, instead of providing the webpage that network administrator 24 has requested via the web browser 10, the intermediary device 18 sends a webpage notification back to the administrator, and lets the administrator proceed to the requested web page after the administrator has been advised of the notification.

In instances where a notification is queued on the intermediary device 18 for notification to the web browser 10 at the administrator, the sequence of flow is as follows. When the next request for a web page is identified to be coming from the web browser 10 at the administrator needing notification at sequence 1b, the intermediary device 18 instead returns a special web page at sequence 2b which contains any pending notifications as well as a link to allow the previous request at sequence 1b to be present. Once the administrator has viewed the notification, the administrator may click the link and trigger a new request at sequence 3b for the original content which is retrieved from the server through the Internet 14 in sequences 4b, 5b, and returns to the web browser 10 at sequence 6b.

Figure 3B:
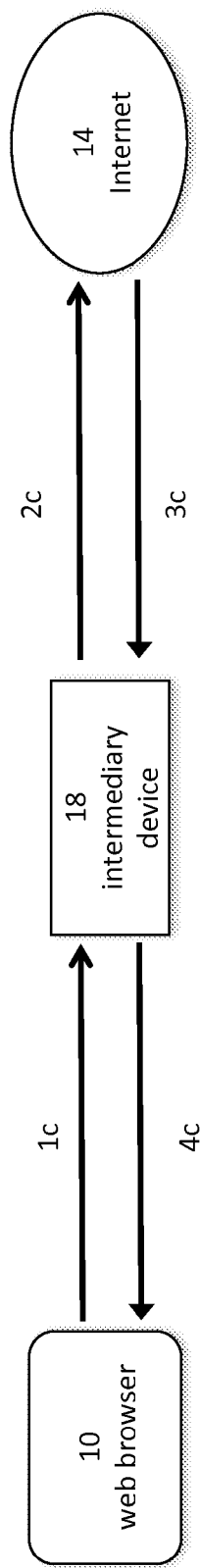

FIG. 3B is a simplified block diagram illustrating sequential flows of an alternate status notification. The web browser 10 (also referred to as "administrator's web browser 10") sends a request at sequence 1c through the intermediary device 18, which in turn generates the server-side request at sequence 2c on the web browser's behalf to the Internet 14. The server's response at sequence 3c is then passed back from the Internet 14 to the intermediary device 18. At sequence 4c, the intermediary device 18 modifies the web page returned from the server to include a notification message, such as adding a javascript. The original content of the web page is edited to include the notification message, which is then delivered to the web browser 10.

Figure 4:
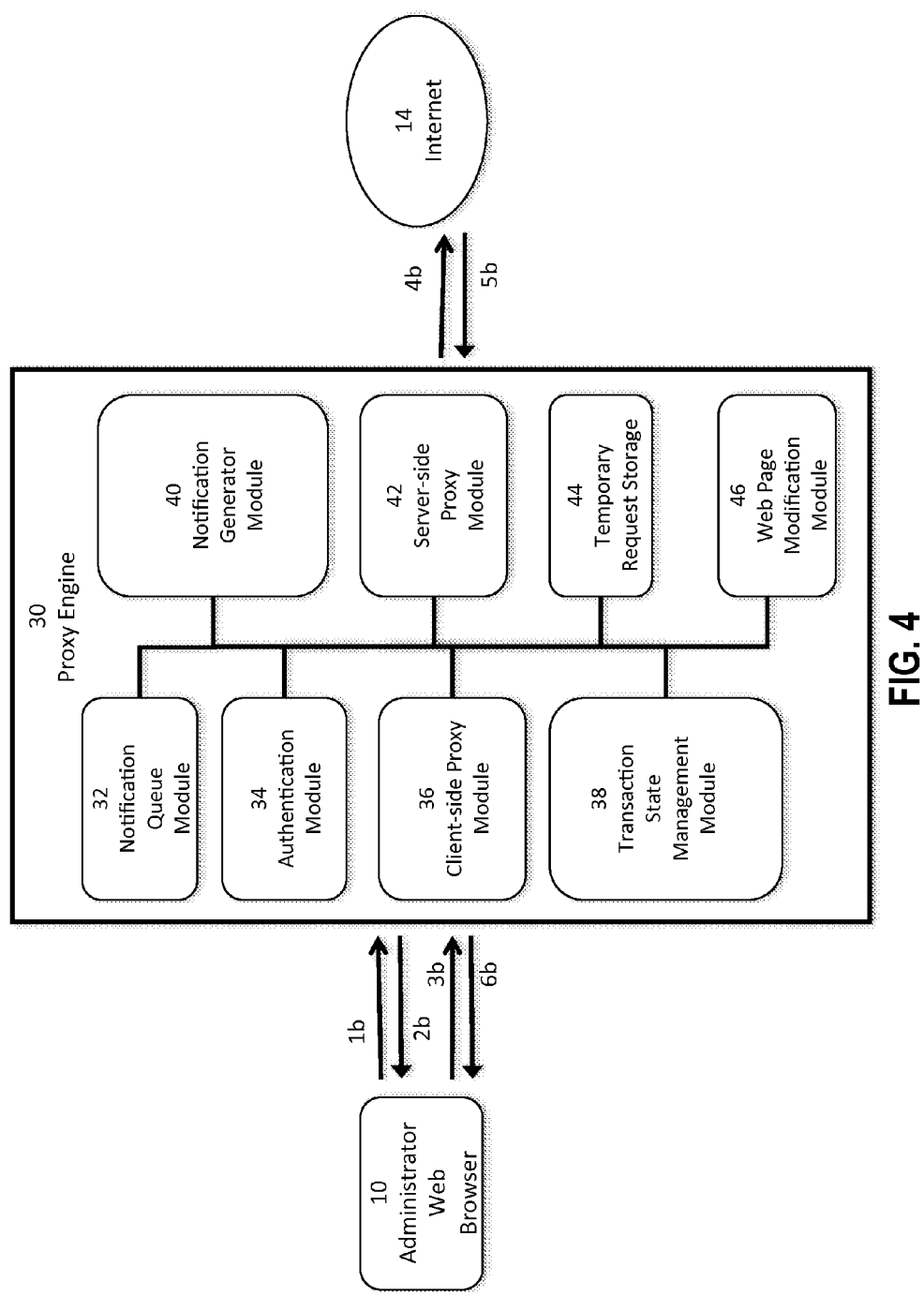
FIG. 4 is a block diagram illustrating a software system for operating the alternate status notification according with an embodiment of the present invention.

FIG. 4 is a block diagram illustrating a software system for operating the alternate status notification according to an embodiment of the present invention. A proxy engine 30, which can be implemented in either software or hardware, resides inside of the intermediary device 18 for communicating between the administrator's web browser 10 and the Internet 14. The network administrator 24 represents the person responsible for managing a proxy server or other systems connected to the intermediary device 18. For example, the network administrator 24 could send a web page request to access Google or Amazon over the Internet 14.

A notification queue module 32, communicatively coupled to the transaction state management module 38, in the proxy engine 30 is configured to store one or more notification messages intended for the network administrator 24 or the administrator's web browser 10. Optionally, the notification queue module 32 can use a prioritized store method to re-sort or re-prioritize based on the importance of the notification messages. The notification queue module 32 serves as a temporary storage location for the notification messages, which are communicated to the network administrator 24 during a subsequent communication.

An authentication module 34 is configured to authenticate that a web page request is sourced from the network administrator 24, rather than a user. That way, the notification messages are able to match up correctly with the network administrator 24 after the authentication module has authenticated the network administrator 24 as having sent the web page request 10. For additional information on the authentication module 34, see for example U.S. patent application Ser. No. 12/019,331 entitled "Method and System for Authentication Among Peer Appliances Within a Computer Network," filed on 24 Jan. 2008, and U.S. patent application Ser. No. 13/218,348 entitled "System and Method for Optimizing Name-Resolution Overhead in a Caching Network Intermediary Device," filed on 25 Aug. 2011, both owned by the assginee of this application and incorporated by reference as if fully set forth herein.

A client-side proxy module 36 (also referred to as "client-side proxy system"), communicatively coupled to the transaction state management module 38, is configured to receive a request from the administrator's web browser 10, and return responses to the administrator's web browser 10. The client-side proxy module 36 represents the client half of the proxy engine 30, which communicates with the client 20 on the client side.

A transaction state management module 38, communicatively coupled to other modules 32, 34, 36, 40, 42, 44, and 46, is configured to track and manage the various states of communications in the proxy engine 30 the administrator's web browser 10 and the Internet 14. Communications between the proxy engine 30 and the network administrator 24 via the administrator's web browser 10 undergo different communication points or states. For example, the transaction state management module 38 determines whether this is the first time that the network administrator 24 has made a request to the proxy engine 30. At another state, the transaction state management module 38 detects that the network administrator 24 has finished reading a notification message. In effect, the transaction state management module 38 manages which part of the communications between the administrator's web browser 10 and the proxy engine 30 have occurred and what additional communications are necessary between the administrator's web browser 10 and the proxy engine 30.

In a first embodiment, a notification generator module 40, communicatively coupled to the transaction state management module 38, is configured to construct a notification message (or notification data) with suitable content for sending to the administrator's web browser 10 when there exists the notification data in a queue intended for the administrator's web browser 10. The notification data comprises any type of data for communicating to the network administrator 24, such as a stored sample text string, e.g. the printer is out of paper, or the CPU of the proxy is too hot. Prior to delivering the notification data to the administrator's web browser 10, the notification generator module 40 places the simple text string in an HTML page, with an HTML link, and provides options on the HTML page for the network administrator 24 to select either that the network administrator 24 has resolved the situation or that the network administrator 24 will address the situation at a later time.

A server-side proxy module 42, communicatively coupled to the transaction state management module 38, is configured to communicate with the Internet 14 and the web server 26. The server-side proxy module 42 represents the server half of the proxy engine 30. In one instance where there is no notification message for the network administrator 24, the administrator's web browser comes into the client-side proxy module 36, and out to the server-side proxy module 42 to the web server 26 via the Internet 14. The web server 26 sends back the requested web page, which comes into the server-side proxy module 42, and is delivered through the client-side proxy module 36 to the administrator's web browser 10. If there is the presence of a notification message for the network administrator 24, the notification generator module 40 constructs a notification message, which the client-side proxy module 36 sends back to the administrator's web browser at sequence 2b. After the network administrator 24 has viewed the notification message, the administrator may click the link and trigger a new request at sequence 3b, which the server-side proxy module 42 will send to the web server 26 for retrieval of the original content from the web page request. In an alternate embodiment, the client-side proxy module 36 is merged with the server-side proxy module 42 in the same block.

A temporary request storage 44, communicatively coupled to the transaction state management module 38, is configured to store an original web page request from the administrator's web browser 10. The proxy engine 30 in the present invention injects a notification message to the network administrator 24, and postpones the execution of the actual web page request until the network administrator 24 has acknowledged the notification message. During this notification transaction, the temporary request storage 44 is configured to store the original web page request, essentially placing the original web page request on hold, for a subsequent retrieval and processing of the original web page request upon the network administrator 24 acknowledging the notification message sent by the notification generator module 40 of the proxy engine 30.

In another embodiment, the proxy engine 30 does not utilize the temporary request storage 44 because the actual client web page request is used to retrieve the returned web page from the web server 26, which is then modified to include the notification as part of the returned web page or as a floating message.

In a second embodiment, instead of creating an entirely new HTML page by the notification generator module 40, a web page modification module 46 is configured to modify an HTML page received from the web server 26 through the Internet 14 in a server-side transaction. When a response comes back from the Internet 14 to the server-side proxy module 42, the web page modification module 46 modifies the retrieved HTML web page to include a notification message (such as placing the notification on top of the HTML page) in addition to the original content, and sends the modified HTML web page to the administrator's web browser 10.

In describing the temporal flow in the first embodiment, when a notification message is queued and the client-side proxy identifies the network administrator 24 via an authentication module 34, the temporary request storage 44 temporarily stores the original web page request at sequence 1b. The notification generator module 40 returns a generated notification page at sequence 2b containing the notification details as well as a special link to acknowledge the notice and proceed with the original request. Once the network administrator 24 clicks the special link at sequence 3b, the original request is extracted from the temporary request storage 44 and forwarded by the server-side proxy module 42 to the original destination server 26 through the Internet 14 at sequence 4b. The web server 26 returns the content of the requested web page via sequence 5b and passes the requested web page to the administrator's web browser 10 at sequence 6b to fulfill the original request.

Figure 5:
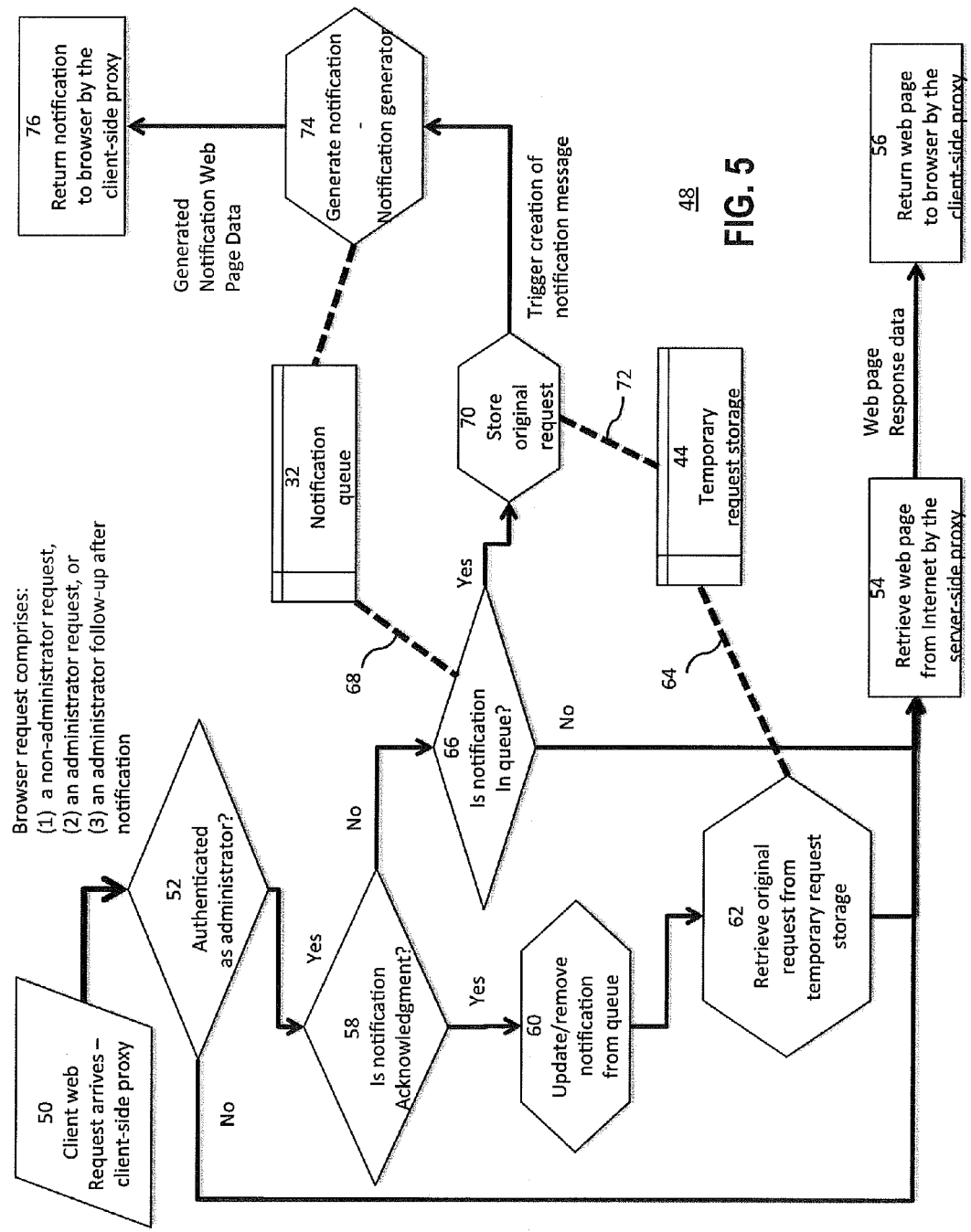
FIG. 5 is a flow diagram illustrating a first embodiment of an operational process of a transaction state management module in the proxy engine of the intermediary device in accordance with the present invention.

FIG. 5 is a flow diagram illustrating a first embodiment of an operational process 48 of a transaction state management in the proxy engine of the intermediary device in accordance with the present invention. The transaction state management flow tracks the various transitional states in a web page request. At step 50, the client-side proxy module 36 is configured to receive a web page request from a browser, which could originate generally from one of the three types. In a first type of request, the client-side proxy module 36 is configured to receive from a non-administrator a web page request from a non administrator, which the proxy engine 30 treats as a normal proxy transaction and takes no action on the request. In a second type of request, the client-side proxy module 36 receives a web page request from the network administrator 24, where there could be a notification in the queue or no notification in the queue directed for the network administrator 24. In a third type of request, the client-side proxy module 36 receives a follow-up to the notification after a notification to the administrator 24 has previously been sent. At step 52, the authentication module 34 is configured to authenticate the traffic to determine whether the received web page request was sent by the network administrator 24 or a non-administrator. If the authentication module 34 determines that the web page request originated from a non-administrator, the process 48 bypasses the main flow and proceeds to steps 54 and 56, in which the server-side proxy module 42 is configured to retrieve the web page from the web server 26 via the Internet 14, and the client-side proxy module 36 returns is configured to return the requested web page to the administrator's web browser 10.

If the web page request originated from the network administrator 24, at step 58, the transaction state management module 38 is configured to determine whether the received request is a special type of message indicating that the message is an acknowledgment to the notification. In such instance, at step 60, the transaction state management module 38 is configured to update or remove the notification from the queue in the notification queue module 32. At step 62, the transaction state management module 38 is configured to retrieve the original web page request from the temporary request storage 44, where the original web page request was stored during the handling of the notification directed to the network administrator, thereby reconnecting the network administrator 24 and the original web page request. A first dotted line 64 in the diagram refers to access to the data in the temporary request storage 44. At step 54, the server-side proxy module 42 is configured to retrieve the original web page from the web server 26 via the Internet 14, and at step 56, the client-side proxy module 36 is configured to return the requested web page to the administrator's web browser 10 or the client 20.

If the transaction state management module 38 determines that the received request is not a notification acknowledgement, at step 66, the transaction state management module 38 is configured to check with the notification queue module 32 to determine whether there is a notification in the queue for the administrator 24. A second dotted line 68 in the diagram denotes access to the data in the notification queue 32. At this juncture, the proxy engine 30 has determined that the original web page request is sent from the administrator 24, the original web page request is not a notification acknowledgment from the administrator 24, and there is a notification in the queue intended for the administrator 24. At step 70, the temporary request storage 44 is configured to store the original web page request so as to make the original web page request available for later use, as shown by a third dotted line 72 denoting access to the temporary request storage 44. At step 74, the notification generator module 40 is configured to generate notification web page data, and at step 76, the client-side proxy module returns the notification web page data to the administrator's web browser 10.

Figure 6:
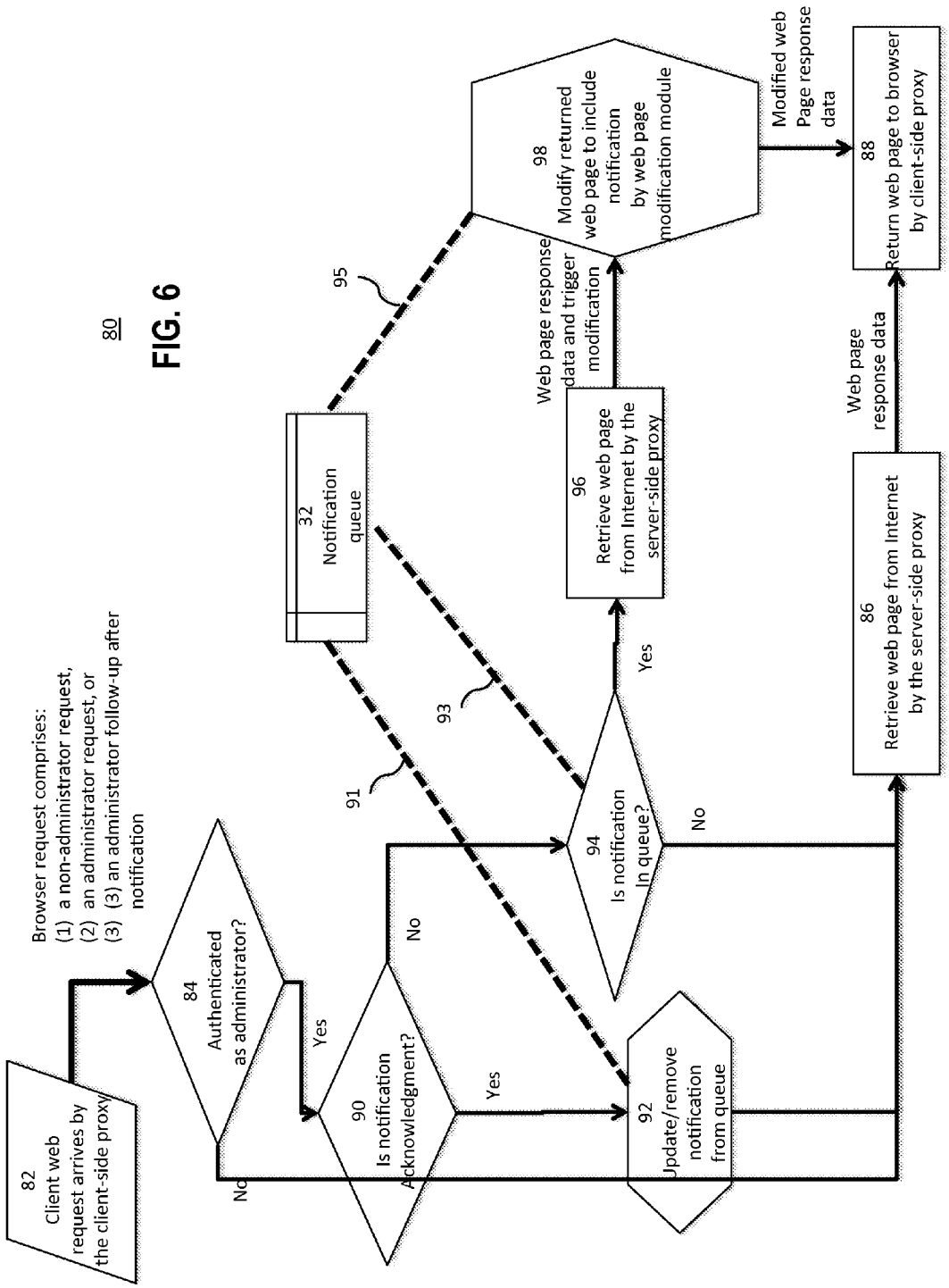
FIG. 6 is a flow diagram illustrating a second embodiment of an operational process of a transaction state management module in the proxy engine of the intermediary device with a page modification feature in accordance with the present invention.

FIG. 6 is a flow diagram illustrating a second embodiment of an operational process 80 of a transaction state management in the proxy engine of the intermediary device with a page modification feature in accordance with the present invention. At step 82, the client-side proxy module 36 is configured to receive a web page request from the web browser 10, which could originate generally from one of three types. In a first type of request, the client-side proxy module 36 is configured to receive from a non-administrator a web page request, which the proxy engine 30 treats as a normal proxy transaction and takes no action on the request. In a second type of request, the client-side proxy module 36 receives a web page request from the network administrator 24, where there could be a notification in the queue or no notification in the queue directed for the network administrator 24. In a third type of request, the client-side proxy module 36 receives a follow-up to the notification after a notification to the administrator 24 has previously been sent. At step 84, the authentication module 34 is configured to authenticate the traffic to determine whether the received web page request was sent by the network administrator 24 or a non-administrator. If the authentication module 34 determines that the web page request originated from a non-administrator, the process 80 bypasses the main flow and proceeds to steps 86 and 88, in which the server-side proxy module 42 is configured to retrieve the web page from the web server 26 via the Internet 14, and the client-side proxy module 36 is configured to return the requested web page to the administrator's web browser 10.

If the web page request originated from the network administrator 24, at step 90, the transaction state management module 38 is configured to determine whether the received request is a special type of message indicating that the message is an acknowledgment to the notification. In such instance, at step 92, the transaction state management module 38 is configured to update or remove the notification from the queue in the notification queue module 32. A first dotted line 91 in the diagram denotes to access to the notification queue 32 to update the notification or modify the notification when there is an acknowledgement. At step 86, the server-side proxy module 42 is configured to retrieve the original web page from the web server 26 via the Internet 14 and to send a web page response data to the client-side proxy module 36. At step 88, the client-side proxy module 36 is configured to return the requested web page response data to the administrator's web browser 10 or the client 20.

If the transaction state management module 38 determines that the received request is not a notification acknowledgement, at step 94, the transaction state management module 38 is configured to check with the notification queue module 32 to determine whether there is a notification in the queue for the administrator 24. A second dotted line 93 in the diagram denotes access to the data or notification in the notification queue 32. If there is no notification in the queue for the administrator, the process 80 continues to step 86, where the server-side proxy module 42 is configured to retrieve the original web page from the web server 26 via the Internet 14 and to send the web page response data to the client-side proxy module 36. At step 88, the client-side proxy module 36 is configured to return the requested web page response data to the administrator's web browser 10 or the client 20.

At this juncture, the proxy engine 30 has determined that the original web page request is sent from the administrator 24, the original web page request is not a notification acknowledgment from the administrator 24, and there is a notification in the queue intended for the administrator 24. At step 96, the server-side proxy module 42 is configured to retrieve the original web page from the web server 26 via the Internet 14, send the web page response data, and trigger modification. At step 98, the web page modification module 46 is configured to modify the returned HTML page by one of several methods to include the notification as part of the returned HTML page to the administrator's web browser 10. One configuration is to include the notification at the top of the HTML page. Another approach is to inject a javascript in which the notification is a floating message that appears at the top of the screen. A third dotted line 95 denotes access to the notification queue 32 to retrieve and modify the notification for inclusion as part of the response data, or the web page. The client-side proxy module 36 is configured to return, at step 88, the modified web page response data to the administrator's web page 10 or the client 20.

In some embodiments, the notification may not be a full web page, but instead take the form of a javascript code-snippet that is inserted non-disruptively into the HTML code of the requested web page. In such instance, the javascript then displays the notification in addition to the requested web page, and no continuation link is then necessary.

In some embodiments, the notification configuration allows the administrator to set his or her username as well as a triggering threshold with an optional periodic update of statistics/system health. Once enabled, at a minimum, service disruption events would receive notification, e.g., license expiry is approaching, but other levels such as new software feature availability would be highly desirable.

Figure 7:
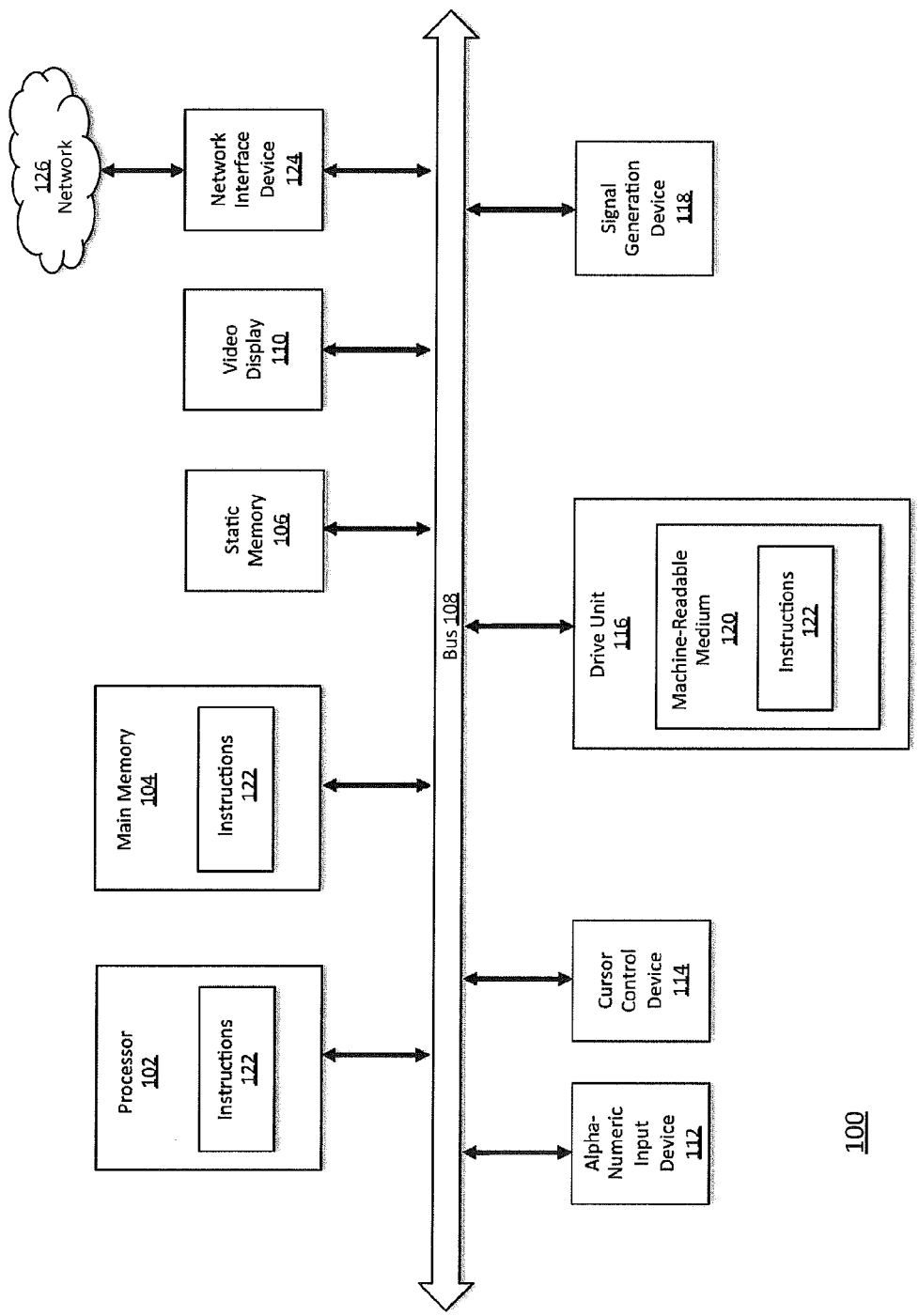
FIG. 7 is a block diagram illustrating a computer device on which computer-executable instructions to perform the methodologies discussed herein may be installed and run.

As alluded to above, the various computer-based devices discussed in connection with the present invention may share similar attributes. FIG. 7 illustrates an exemplary form of a computer system 100, in which a set of instructions can be executed to cause the computer system to perform any one or more of the methodologies discussed herein. The computer system 100 may represent any or all of the clients 20, servers or network intermediary devices 18 discussed herein. Further, while only a single machine is illustrated, the term "machine" shall also be taken to include any collection of machines that individually or jointly execute a set (or multiple sets) of instructions to perform any one or more of the methodologies discussed herein. The exemplary computer system 100 includes a processor 102 (e.g., a central processing unit (CPU), a graphics processing unit (GPU), or both), a main memory 104 and a static memory 106, which communicate with each other via a bus 108. The computer system 100 may further include a video display unit 110 (e.g., a liquid crystal display (LCD)). The computer system 100 also includes an alphanumeric input device 112 (e.g., a keyboard), a cursor control device 114 (e.g., . . . a mouse), a disk drive unit 116, a signal generation device 118 (e.g., a speaker), and a network interface device 124.

The disk drive unit 116 includes a machine-readable medium 120 on which is stored one or more sets of instructions (e.g., software 122) embodying any one or more of the methodologies or functions described herein. The software

122 may also reside, completely or at least partially, within the main memory 104 and/or within the processor 102 during execution thereof, the computer system 100, the main memory 104, and the instruction-storing portions of processor 102 also constituting machine-readable media. The software 122 may further be transmitted or received over a network 126 via the network interface device 124.

While the machine-readable medium 120 is shown in an exemplary embodiment to be a single medium, the term "machine-readable medium" should be taken to include a single medium or multiple media (e.g., a centralized or distributed database and/or associated caches and servers) that store the one or more sets of instructions. The term "machine-readable medium" shall also be taken to include any tangible medium that is capable of storing a set of instructions for execution by the machine and that causes the machine to perform any one or more of the methodologies of the present invention. The term "machine-readable medium" shall accordingly be taken to include, but not be limited to, solid-state memories, and optical and magnetic media.

Some portions of the detailed descriptions that follow are presented in terms of algorithms and symbolic representations of operations on data within a computer memory or other storage device. These algorithmic descriptions and representations are the means used by those skilled in the data processing arts to most effectively convey the substance of their work to others skilled in the art. An algorithm is here, and generally, conceived to be a self-consistent sequence of processing blocks leading to a desired result. The processing blocks are those requiring physical manipulations of physical quantities. Throughout the description, discussions utilizing terms such as "processing," or "computing," or "calculating," or "determining," or "displaying," or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic-optical disks, read-only memories (ROMs), random access memories (RAMs), erasable programmable ROMs (EPROMs), electrically erasable and programmable ROMs (EEPROMs), magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

Moreover, terms such as "request," "client request," "requested object," or "object" may be used interchangeably to mean action(s), object(s), and/or information requested by a client from a network device, such as an intermediary or a server. In addition, the terms "response" or "server response" may be used interchangeably to mean corresponding action (s), object(s), and/or information returned from the network device. Furthermore, the terms "communication" and "client communication" may be used interchangeably to mean the overall process of a client making a request and the network device responding to the request.

The present invention has been described in particular detail with respect to possible embodiments. Those skilled in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. The system may be implemented via a combination of hardware and software, as described, or entirely in hardware elements, or entirely in software elements. The particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for causing a processor in a computing device or other electronic device to perform the above-described techniques.

As used herein, any reference to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" and any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

It should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

An ordinary artisan should require no additional explanation in developing the methods and systems described herein but may nevertheless find some possibly helpful guidance in the preparation of these methods and systems by examining standard reference works in the relevant art.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. The terms used should not be construed to limit the invention to the specific embodiments disclosed in the specification and the claims, but should be construed to include all methods and systems that operate under the claims set forth herein below. Accordingly, the invention is not limited by the disclosure, but instead its scope is to be determined entirely by the following claims.

What is claimed and desired to be secured by Letters Patent of the United States is:

1. A computer-implemented method, comprising:
   receiving a web page request at a proxy device communicatively coupled to a web browser and a web server;
   following a determination that the web page request is from a network administrator, determining if a queue contains a notification message directed to the network administrator;
   in response to determining that the queue contains said notification message directed to the network administrator, (i) storing the web page request in a temporary request storage for subsequent use prior to fulfilling the web page request, and (ii) sending the notification message to the web browser, the notification message including a link; and
   in response to receiving an indication of an activation of the link, (i) extracting the web page request from the temporary storage, (ii) forwarding the web page request to the web server, (iii) receiving a web page from the web server, the web page received in response to the forwarded web page request, and (iv) transmitting the web page to the web browser.

2. A computer-implemented method, comprising:
   receiving a web page request at a proxy device communicatively coupled to a web browser and a web server;
   following a determination that the web page request is from a network administrator, storing the web page request in a temporary request storage for subsequent use prior to fulfilling the web page request and determining if a queue contains a notification message directed to the network administrator; and
   in response to determining that the queue contains said notification message directed to the network administrator, (i) extracting the web page request from the temporary storage, (ii) sending the web page request to the web server receiving a web page from the web server, the web page received in response to the web page request, (iii) modifying the web page to include the notification message, and (iv) sending the modified web page to the web browser.

3. The computer-implemented method of claim 2, wherein the web page is modified by placing the notification message at the top of the web page.

4. The computer-implemented method of claim 2, wherein the web page is modified by injecting JavaScript into HTML code of the web page so as to display the notification message as a floating message.

5. The computer-implemented method of claim 2, wherein the web page is modified by embedding the notification message into the web page.

6. A non-transitory machine-readable storage medium comprising software instructions that, when executed by a processor, cause the processor to:
   receive a web page request at a proxy device communicatively coupled to a web browser and a web server;
   following a determination that the web page request is from a network administrator, determine if a queue contains a notification message directed to the network administrator; and
   in response to determining that the queue contains said notification message directed to the network administrator, (i) store the web page request in a temporary request storage for subsequent use prior to fulfilling the web page request, and (ii) send the notification message to the web browser, the notification message including a link; and
   in response to receiving an indication of an activation of the link, (i) extract the web page request from the temporary storage, (ii) forward the web page request to the web server, (iii) receive a web page from the web server, the web page received in response to the forwarded web page request, and (iv) transmit the web page to the web browser.

7. A non-transitory machine-readable storage medium comprising software instructions that, when executed by a processor, cause the processor to:
   receive a web page request at a proxy device communicatively coupled to a web browser and a web server;
   following a determination that the web page request is from a network administrator, store the web page request in a temporary request storage for subsequent use prior to fulfilling the web page request and determine if a queue contains a notification message directed to the network administrator; and
   in response to determining that the queue contains said notification message directed to the network administrator, (i) extract the web page request from the temporary storage, (ii) send the web page request to the web server receiving a web page from the web server, the web page received in response to the web page request, (iii) modify the web page to include the notification message, and (iv) send the modified web page to the web browser.

* * * * *